United States Patent [19]

Holstein et al.

[11] 3,960,056

[45] June 1, 1976

[54] VERTICAL BROACHING MACHINE

[75] Inventors: Herbert Holstein, Solingen; Armin Farrenkothen, Wuppertal, both of Germany

[73] Assignee: Oswald Forst Maschinenfabrik und Apparatebauanstalt GmbH, Solingen, Germany

[22] Filed: Dec. 24, 1974

[21] Appl. No.: 536,225

[30] Foreign Application Priority Data

Jan. 4, 1974  Germany.......................... 2400236

[52] U.S. Cl.......................................... 90/73; 90/90; 90/93; 214/1 BD
[51] Int. Cl.²................... B23D 37/10; B23D 41/06
[58] Field of Search............... 90/71, 73, 87, 88, 90, 90/91, 93, 94; 214/1 BD, 130 R

[56] References Cited
UNITED STATES PATENTS

| | | |
|---|---|---|
| 845,152 | 2/1907 | Weir .............................. 214/130 R |
| 1,318,485 | 10/1919 | Donaldson ............................. 90/73 |
| 1,905,164 | 4/1933 | Ferris et al........................... 90/73 X |
| 2,571,904 | 10/1951 | Lofgren ................................. 90/73 |
| 2,726,704 | 12/1955 | Fischer ............................... 90/90 X |
| 3,799,030 | 3/1974 | Schubert................................ 90/73 |

*Primary Examiner*—Othell M. Simpson
*Assistant Examiner*—Fred A. Silverberg
*Attorney, Agent, or Firm*—Browdy and Neimark

[57] ABSTRACT

A vertical internal broaching machine includes a workpiece holder mounted on a machining table of the broaching machine. A vertically displaceable broaching slide is mounted beneath the machining table which slide draws a broach through a workpiece at the workpiece holder. A vertically displaceable broach feed slide is mounted above the workpiece holder, and an inclined feed channel for the workpieces terminates in front of and above the workpiece holder. A mask extends up to one end of the feed channel and is swivelable from the plane of the feed channel to the workpiece holder by means of a swiveling drive means. An ejection chute extends from the mask. A separating means is mounted above the feed channel for releasing workpieces to the mask when the mask is in the raised position. A stop mounted on the broaching slide associated with the workpiece holder projects between the mask and the ejection chute when the broaching slide is in the raised position and releases the mask when the broaching slide is in the lowered position.

6 Claims, 4 Drawing Figures

VERTICAL BROACHING MACHINE

FIELD OF THE INVENTION

The invention concerns a vertical broaching machine, especially an internal broaching machine with at least one workpiece holder mounted on a machining table, with a vertically displaceable broaching slide mounted beneath the machining table, said slide drawing at least one broach through the workpiece or workpieces, with a vertically displaceable broach feed channel mounted above the workpiece holder, with an inclined feed channel for workpieces, said channel terminating in front of and above the workpiece holder, with a mask located at the end of the feed channel, said mask being swivelable from the plane of said channel to the workpiece holder and back by means of a swiveling drive, with an injection chute located downstream from the mask, and with a separating means mounted above the feed channel, said separating means being operable between two end positions and releasing one workpiece to each workpiece holder with the mask in the raised position.

BACKGROUND OF THE INVENTION

In similar broaching machines which have become known in this country through their prior manifest use and which are described in U.S. Pat. No. 3,799,030, issued subsequently, the separating means is operated by a hydraulic cylinder actuated by appropriately controlled solenoid valves. Blocking elements are provided on the mask or on the feed channel, said elements being activated by hydraulic actuating cylinders, with said cylinders once again being actuated by appropriately controlled solenoid valves. The cost of the hydraulic actuating cylinders and the corresponding control elements is disadvantageous from the standpoint of cost and with regard to the likelihood of failure.

U.S. Pat. No. 2,571,904 teaches a vertical external broaching machine with a fixed broach and workpiece slide, holding a workpiece, which moves past the broach. A stop with a guide surface is provided on the workpiece slide, said stop actuating a separating means via a connecting rod. When the separating means is actuated, a workpiece slides from a feed channel to a position in front of the opening of a clamping jaw holder mounted on the workpiece slide, said holder engaging the workpiece by pushing aside a spring-loaded stop during a broaching stroke and then carrying the workpiece past the broach.

SUMMARY OF THE INVENTION

The goal of the invention is to design a vertical broaching machine of the type described hereinabove such that the movements of the machine are used to deliver the workpiece to the mask.

This goal is achieved according to the invention by providing a stop mounted on the broaching slide of each workpiece holder, said stop projecting between the mask and the ejection chute, said stop blocking the mask with the broaching slide in the raised position and cutting it off from the discharge chute, and releasing the mask when the broaching slide is in the lowered position. The measures according to the invention employ the movement of the broaching slide to prevent the workpiece from sliding into the discharge chute as they are fed to the mask by the feed channel before being broached, thus eliminating the heretofore necessary hydraulic actuating cylinder for holding and releasing the workpieces, thus ensuring a significant decrease in construction cost and a marked rise in operating safety.

The stops simultaneously serve as a guide for the workpiece on their way to the workpiece holder if, according to advantageous embodiment of the invention, each stop is provided with a guide surface that guides a workpiece in contact with it so that said workpiece enters the workpiece holder as the mask swings down. Advantageously this guide surface is made slightly arcuate, with the midpoint of the arc being approximately on the swivel axis of the mask with the broaching slide in the raised position. A particularly simple embodiment is then obtained if the mask and corresponding ejection chute are made integral and commonly swivelable.

According to a further advantageous feature of the invention, a stop is provided on the broach feed channel, said stop bringing the separating means to one of its end positions with the feed channel in the raised position. This measure ensures that the movement of the broach feed channel is employed to actuate the separating means. The hydraulic actuating cylinder required heretofore and the entire control system related thereto are thus eliminated. It is also highly advantageous if the separating means is held in its other end position by means of a pressure spring.

BRIEF DESCRIPTION OF THE DRAWING

Further advantages and features of the invention will be evident from the description of an exemplary embodiment with reference to the drawings.

DETAILED DESCRIPTION OF THE PREFERRED EMBODIMENTS

Figure 1:
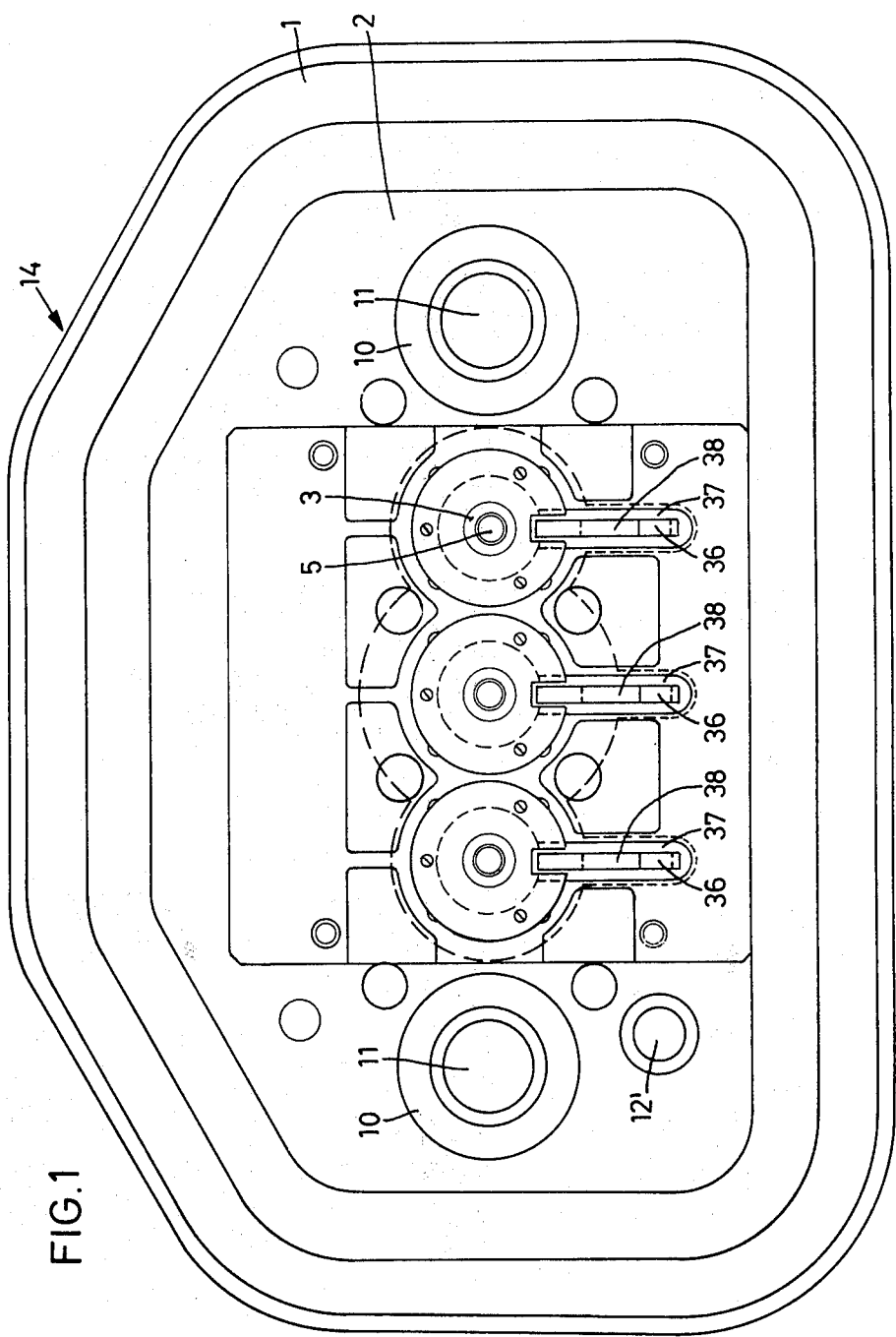
FIG. 1 is a top view of the machining table of a vertical internal broaching machine.

A horizontally disposed machining table 2 is mounted on a conventional bed plate 1, the table 2 also being referred to as a die carrier plate. Three workpiece holders 3 are mounted on machining table 2, the holders 3 serving to support workpieces 4 to be broached. Since the present case involves an internal broaching machine, bores 5 and 6 (FIG. 2) are located coaxially in workpiece holders 3 and correspondingly in machining table 2, so that a broach (not shown) can be pulled, as is conventional, downward through a corresponding bore 7 in workpiece 4, bore 7 being coaxial with both bores 5 and 6. For this purpose, the broach is gripped by its shank head in a shank holder, likewise not shown, the shank holder being mounted in a corresponding bore 8 in a broaching slide 9. The slide is mounted beneath machining table 2 and is vertically displaceable. The broaching slide 9 is guided by two guide columns 10 that lie in a vertical plane passing through the central axes of the broaches. The broaching slide 9 is driven by a vertically acting hydraulic main actuating cylinder 11, mounted on guide columns 10.

A broach feed slide 12 is located above machining table 2. The slide 12 is vertically displaceable in a plane passing through the broaches and guide columns 10, by means of a hydraulic actuating cylinder 12'. Broach feed slide 12 is provided at its lower end with a butt holder 13 for each broach, so that the upper butt end of a broach is held in said holder 13 during the downward stroke of the broaching cycle and so that the broach may be withdrawn subsequently. The broaching machine described hereinabove is known and operates in known fashion, i.e., the broaches gripped in the shank holders of broaching slide 9 are pulled through bores 7 in workpieces 4 during the downward movement of broaching slide 9, thus cutting the desired profile in bore 7. Following completion of the broaching cycle, the broaches are released from the butt holders 13 and drawn downward completely through the workpieces. The workpieces are then removed from the workpiece holders 3 in a manner to be described hereinbelow. Then broaching slide 9 together with the broaches is raised again until the upper butts of the broaches are again gripped by butt holders 13. Then the broach feed slide 12 together with the broaches is raised until the broaches are definitely above the workpiece holders, i.e., above the feed channel for new workpieces, whereupon the broach shanks are released from the shank holders in the broach feed channels. When new workpieces 4 have been fed to workpiece holders 3, the broaches are introduced through the workpieces and bores 5 and 6 from above and gripped again by the shank holders. A new broaching cycle then begins.

A feed channel 15 which slopes toward the machining table is provided above the front side of the machining table 2, with guide channels 16 for workpieces 4 being provided in a row on said feed channel 15. The number of guide channels 16 corresponds to the number of workpiece holders 3 and the channels 16 are located at the same intervals as the latter. A so-called separating means 17 is provided above the feed channel 15 and a short distance in front of its lower end. The purpose of said means 17 is either to grip the lower workpiece 4 resting in feed channel 15 or, when this workpiece has been released, to grip the next one, so as to allow a single workpiece 4 to slide from each guide channel 16 to a corresponding mask 18.

This separating means 17 is mounted on a cross arm 19 supported on arms 20 above bed plate 1. It consists essentially of two gripping fingers 21 and 22 guided in a vertical guide 23. They are linked together at their upper ends by a rocking lever 24 which is swivelable at its center around a horizontal axis 25 in such fashion that when one of the gripping fingers 21 moves downward the other gripping finger 22 moves upward, and vice versa. To this extent, this separating means 17 is likewise known. The gripping finger 21 adjacent to the end of the feed channel 15 is extended upward by an operating rod 26 which has a cap 27 at its upper end, formed by a flange, plate or the like. In addition, this gripping finger 21 is tensioned from above by a compression spring 28 which surrounds operating rod 26 concentrically, spring 28 resting at the top against a sealing plate 29 fastened to cross arm 19.

An angular, for example, stop 30 is mounted on broach feed slide 12. The stop 30 striking beneath cap 27 on operating rod 26 and thus lifting the gripping finger 21 as the feed channel rises to its upper position during the final stage of its upward movement, while the other gripping finger 22 is simultaneously moved downward because of the linkage of the two gripping fingers 21 and 22 by rocking lever 24. This releases the workpiece located at the lower end of feed channel 15, while the next workpiece is simultaneously gripped by gripping finger 22. The lower workpiece can then slide onto mask 18 below the feed channel, precisely when the guide channel together with the broaches has travelled all the way upward.

Figure 3:
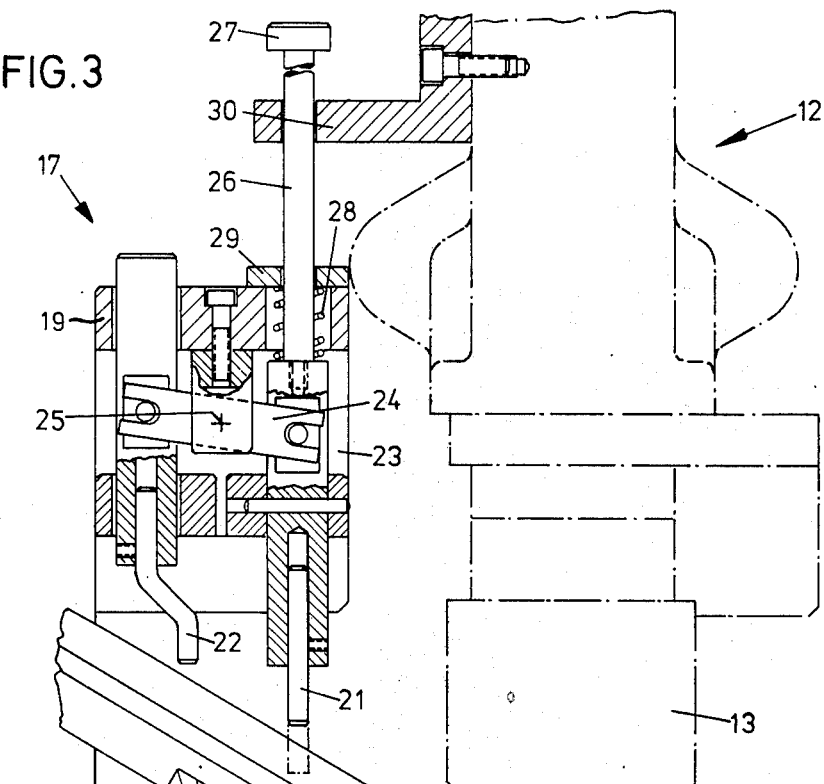
FIG. 3 is a more detailed view of the separating means which is merely indicated in FIG. 2.

When the feed slide 12 again descends slightly, in order to guide the lower shanks of the broaches into the shank holders in broaching slide 9, operating rod 26 is again released, with the result that gripping finger 21, adjacent to the end of the feed channel, is pushed downward bt compression spring 28, while the other gripping finger 22 is simputaneously pushed upward, so that the workpiece gripped by the latter is released and can slide down against gripping finger 21. The separating means 17 remains in this position during the entire subsequent broaching cycle, until feed slide 12 with the broaches is again raised all the way up. As can be seen in FIG. 3, gripping fingers 21 and 22 are interchangeable, so that one gripping finger 22 can be bent at right angles in order to allow adjustment of the distance between the lower ends of the gripping fingers 21, 22 for different work-piece diameters.

Figure 2:
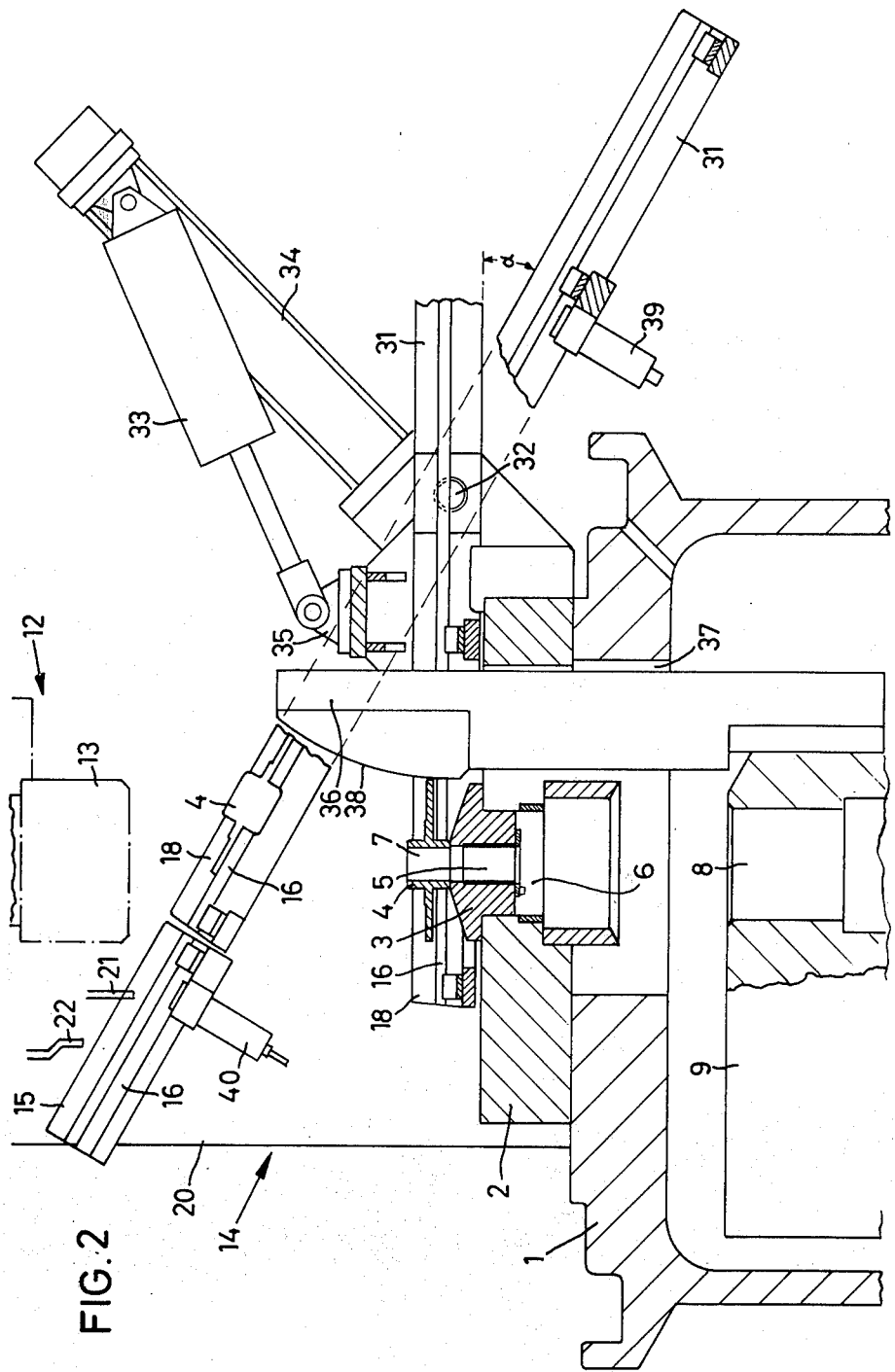
FIG. 2 is a partial lengthwise section through the machine along section line II—II in FIG. 1.

Downstream from feed channel 15 is a mask 18 in the form of a swiveling mask, the mask 18 in the present case being made integral with an ejection chute 31, chute 31 bein downstream from said mask 18. Guide channels 16 theoretically identical to those on feed channel 15 are provided in mask 18 and ejection chute 31 for workpieces 4. The unit composed of mask 18 and ejection chute 31 is swivelable about a swivel axis 32 which is mounted horizontally relative to bedplate 1. The swiveling movement is effected by a hydraulic actuating cylinder 33, linked at one end to a fixed bracket 34 mounted on bedplate 1 above ejection chute 31. The other end of actuating cylinder 33 is mounted in a thrust bearing 35 attached to ejection chute 31. The drawing in FIG. 2 shows actuating cylinder 33 and thrust bearing 35 with mast 18 and ejection chute 31 in the horizontal position. The swiveling movement is effected between the two extreme positions shown in FIG. 2 through an angle to the position indicated partly in phantom in FIG. 2.

On broaching slide 9, upward projecting stops 36 are interchangeably mounted with respect to each workpiece holder 3 and hence with respect to each corresponding guide channel 16. Stops 36 are mounted on the side of broaching slide 9 facing ejection chute 31. These stops 36, which can be made from a simple bending-resistant bar, when broaching slide 9 is raised, protrude through corresponding openings 37 in machining table 2 and through a corresponding opening located in guide channel 16, in mask 18 or ejection chute 31 for a distance such that they block the cross section of guide channel 16 when mask 18 is raised, so that a workpiece 4 that has slid into the mask 18 rests against this stop 36.

Each stop 36 is associated with an arcuate guiding portion 38 whose center of curvature lies on the swivel axis of mask 18 when the broaching slide is locked in the raised position. This form for the guiding portion 38 is not compulsory, however, since the only critical point is that workpiece 4, with its outer side resting against guiding portion 38, must be guided into its horizontal position when mask 18 swings down, so that its bore 7 rests on and is roughly coaxial with bore 5 in workpiece holder 3. It may be advantageous to have the guiding portion 38 constructed slightly so that the workpiece rests on workpiece holder 3 with sufficient radial play; centering is then accomplished by the corresponding broach. The stops 36 are interchangeable with respect to broaching slide 9, so that appropriate adjustment of stops 36 and especially guide channels 38 can be made when working with other workpieces 4 with different outside diameters.

The method of operation is as follows: as we have described hereinabove, with feed slides 12 in the completely raised position, workpiece 4 is released into feed channel 15 and slides against mask 18, which is in the raised position. Since the broaching slide is also in the raised position for this position of feed slide 12, workpiece 4 slides against the upper end of guiding portion 38 at stop 36 and is held there. Then the actuation of operating cylinder 33 swings mask 18 and thus simultaneously ejection chute 31 to the horizontal position, so that workpiece 4 is guided from guiding portion 38 to the corresponding wotkpiece holder 3. Mask 18 swings down until the workpiece no longer rests in guide channel 16 but only on workpiece holder 3. Then feed slide 12 moves downward until the shank of each broach is gripped by a shank holder. Then the broaching slide 9 moves downward, broaching the workpieces 4. At the end of the broaching cycle butt holders 13 release the broaches, which are then drawn downward completely through workpiece 4. In this lower position of the broaching slide 9, stops 36 have also traveled below machining table 2, so that as mask 18 swings up again the finished, broached workpieces 4 can slide freely down the ejection chute, which has been simultaneously swung down. Now the broaching slide is raised again, the broaches are gripped by butt holders 13 in feed channel 12 and carried all the way up. At the end of this movement, a workpiece is again released by gripping finger 21 in the manner described hereinabove so that it can slide against mask 18.

Limiting switches 39 and 40, operating without contact are mounted at the lower end of feed channel 15 and on ejection chute 31. These switches produce a signal each time a workpiece slides from feel channel 15 against mask 18 or from mask 18 through ejection chute 31. In addition, it should be mentioned for the sake of completeness that it is only for reasons of limited space that broaching slide 9 is shown in its uppermost position and feed slide 12 is simultaneously shown in its lowest position. Such a mutual position of broaching slide 9 and broach feed slide 12 cannot occur during operation; for this reason, broach feed slide 12 has likewise been indicated by dashed lines.

Figure 4:
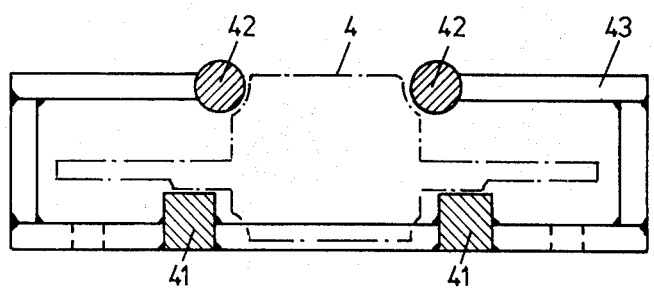
FIG. 4 is a cross section through a guide channel on a scale considerably larger than in FIGS. 1 to 3.

FIG. 4 shows a cross section of guide channel 16. It consists of two lower guide rods 41 on which workpiece 4 rests, and of two upper rods 42 which guide the workpiece diagonally with respect to its sliding direction. The four parallel guide rods 41 and 43 are linked together by connecting elements 42, for example iron plates. In this embodiment of guide channels 16, feed channel 15, mask 18 and ejection chute 31 need be only frames on which such guide channels 16 (interchangeable for various workpiece shapes) are mounted. Guide channel 16 gives the workpieces in the mask a definite vertical position parallel to swivel axis 32, while a position at right angles to these two directions is produced by guide surfaces 38 of stops 36. It should be added that the spacing of the two upper guide rods 42 is advantageously such that workpiece 4 is located between them with some play in order to allow exact centering on workpiece holder 3 by the broach.

It will be obvious to those skilled in the art that various changes may be made without departing from the scope of the invention and the invention is not to be considered limited to what is shown in the drawings and described in the specification.

What is claimed is:

1. Vertical broaching machine, specifically an internal broaching machine, including:
    at least one workpiece holder mounted on a machining table of the broaching machine;
    a vertically displaceable broaching slide mounted beneath said machining table for drawing a broach through a workpiece at the at least one workpiece holder;
    a vertically displaceable broach feed slide mounted above the at least one workpiece holder;
    at least one inclined feed channel for workpieces, said channel terminating in front of and above the at least one workpiece holder;
    at least one mask extending up to one end of the at least one feed channel, said at least one mask being swivelable from the plane of said at least one feed channel to the at least one workpiece holder and back again by means of a swiveling drive means;
    at least one ejection chute extending from the at least one mask;
    at least one separating means mounted above the at least one feed channel, said at least one separating means being for moving between two end positions and releasing one workpiece to the at least one workpiece holder when the at least one mask in the raised position; and
    at least one stop mounted on the broaching slide associated with each of the at least one each workpiece holders, said at least one stop projecting between the at least one mask and the at least one ejection chute, and, said at least one stop also blocking the at least one mask when the broaching slide is in the raised position and cutting the at least one mask off from the at least one discharge chute, and further said at least one stop releasing the at least one mask when the broaching slide is in the lowered position.

2. A broaching machine according to claim 1, wherein said at least one stop has a guide portion which guides a workpiece in contact therewith so that said workpiece enters the at least one workpiece holder as the at least one mask swings down.

3. A broaching machine according to claim 2, wherein the guide portion is slightly arcuate with the midpoint of the arc being approximately on the swivel axis of the at least one mask when the broaching slide is in the raised position.

4. A broaching machine according to claim 1, wherein the at least one mask and at least one ejection chute are made in an integral part and are commonly swivelable.

5. A broaching machine according to claim 1, wherein a separator stop is mounted on the broach feed slide, said stop being associated with the at least one separating means to thereby move the at least one separating means to one of its end positions when the broach feed slide is in raised position.

6. A broaching machine according to claim 5, wherein the separating means is held in the other end position thereof by means of a pressure spring when the broach feed slide is in the lowered position.

* * * * *